US011217239B2

(12) United States Patent
Schlesinger et al.

(10) Patent No.: US 11,217,239 B2
(45) Date of Patent: *Jan. 4, 2022

(54) COMPUTER PROXY MESSAGING BOT

(71) Applicant: Microsoft Technology Licensing, LLC, Redmond, WA (US)

(72) Inventors: Benny Schlesinger, Ramat Hasharon (IL); Hen Fitoussi, Ramat Hasharon (IL); Avichai Cohen, Givat Shmuel (IL); Yuval Pinchas Borsutsky, Rishon le-zion (IL); Eldar Cohen, Tel Aviv (IL); William Ramsey, Redmond, WA (US); Delia Koren, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,472

(22) Filed: Feb. 25, 2019

(65) Prior Publication Data
US 2019/0189121 A1 Jun. 20, 2019

Related U.S. Application Data

(63) Continuation of application No. 15/182,059, filed on Jun. 14, 2016, now Pat. No. 10,360,906.

(51) Int. Cl.
*G10L 15/22* (2006.01)
*G06Q 10/10* (2012.01)
(Continued)

(52) U.S. Cl.
CPC .......... *G10L 15/22* (2013.01); *G06F 16/3329* (2019.01); *G06F 40/35* (2020.01);
(Continued)

(58) Field of Classification Search
CPC ............... G10L 15/22; G10L 2015/228; G10L 2015/225; G06F 40/56; G06F 40/40;
(Continued)

(56) References Cited

U.S. PATENT DOCUMENTS 5,579,223 A 11/1996 Raman
5,920,721 A 7/1999 Hunter et al.
(Continued)

FOREIGN PATENT DOCUMENTS

JP 2000322245 A 11/2000

OTHER PUBLICATIONS

"Supplemental Notice of Allowability Issued in U.S. Appl. No. 16/188,753", dated Aug. 7, 2019, 3 Pages.
(Continued)

Primary Examiner — Qian Yang

(57) ABSTRACT

A computer system can conduct corresponding natural language dialogs with multiple computer-readable profiles using a computer proxy messaging bot. For example, a first set of natural language instructions can be received via a computer messaging proxy bot from a first computer-readable profile. The first set of natural language instructions can be analyzed via the proxy bot. Also, first and second natural language dialog scripts can be generated via the proxy bot using results of the analyzing of the first set of natural language instructions, with the second natural language dialog script including natural language data derived from the first set of natural language instructions. The first natural language dialog script can be sent to the first profile via the proxy bot and the second natural language dialog script can be sent to a second computer-readable profile via the proxy bot, both in response to the first set of instructions.

20 Claims, 6 Drawing Sheets

(51) Int. Cl.
  *G06Q 30/06* (2012.01)
  *G06F 16/332* (2019.01)
  *G06F 40/35* (2020.01)
  *G06F 40/40* (2020.01)
  *G06F 40/56* (2020.01)

(52) U.S. Cl.
  CPC .............. *G06F 40/40* (2020.01); *G06F 40/56* (2020.01); *G06Q 10/10* (2013.01); *G06Q 30/0601* (2013.01); *G10L 2015/225* (2013.01); *G10L 2015/228* (2013.01)

(58) Field of Classification Search
  CPC . G06F 40/35; G06F 16/3329; G06Q 30/0601; G06Q 10/10
  See application file for complete search history.

(56) References Cited

U.S. PATENT DOCUMENTS

| | | |
|---|---|---|
| 9,275,641 B1 | 3/2016 | Gelfenbeyn et al. |
| 2007/0168480 A1 | 7/2007 | Biggs et al. |
| 2008/0114837 A1* | 5/2008 | Biggs .................... G06F 40/279 709/206 |
| 2014/0244712 A1* | 8/2014 | Walters .................. G06F 3/167 709/202 |
| 2016/0035353 A1* | 2/2016 | Chen ...................... G10L 17/22 704/235 |
| 2016/0147507 A1 | 5/2016 | Cheng et al. |
| 2016/0240192 A1* | 8/2016 | Raghuvir ............... G10L 15/22 |
| 2019/0079926 A1 | 3/2019 | Schlesinger et al. |

OTHER PUBLICATIONS

"Office Action Issued in European Patent Application No. 17739746.0", dated May 12, 2021, 7 Pages.

"Tuto: Comment Creer Un Bot Pour Facebook Messenger", Retrieved From: https://www.networkshare.fr/2016/05/comment-creer-bot-facebook-messenger/, May 12, 2016, 11 Pages.

"Office Action Issued in European Patent Application No. 17739747.8" dated May 26, 2021, 6 Pages.

* cited by examiner

COMPUTER PROXY MESSAGING BOT

RELATED APPLICATIONS

The present application is a continuation of U.S. application Ser. No. 15/182,059 (now U.S. Pat. No. 10,360,906), filed Jun. 14, 2016, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

A messaging bot (or messaging robot) is a configuration of computer hardware (e.g., dedicated hardware logic components and/or hardware configured with software) that, when it is run or executed, automatically interacts using a natural language dialog, which can include receiving natural language instructions, processing those instructions, and responding with natural language dialog scripts. A natural language is a language used in natural conversation between human beings, such as Mandarin Chinese, Spanish, English, Hindi, Arabic, Portuguese, Japanese, German, French, etc. Natural language can also include language modifications that are used in natural conversation between human beings in various different contexts, such as digital messaging conversations, in-person conversations, etc. For example, such modifications may include mixtures of formal languages, abbreviations, and/or slang. Messaging bots have typically been employed to conduct dialogs with computer-readable profiles, which are collections of computer-readable profile data in computer systems that can be active in computer environments (such as where credentials for a profile have been submitted into the computer system to log into an environment with the profile), with the bot receiving natural language instructions from one or more profiles and responding to instructions by generating and sending responsive dialog scripts.

SUMMARY

The tools and techniques discussed herein relate to computer proxy messaging bots. For example, a computer system can conduct corresponding natural language dialogs with multiple computer-readable profiles using a computer proxy messaging bot.

In one example aspect, the tools and techniques can include receiving via a computer proxy messaging bot, a first set of natural language instructions from a first computer-readable profile. The first set of natural language instructions can be analyzed via the proxy bot. Also, first and second natural language dialog scripts can be generated via the proxy bot using results of the analyzing of the first set of natural language instructions, with the second natural language dialog script including natural language data derived from the first set of natural language instructions. The first natural language dialog script can be sent to the first profile via the proxy bot and the second natural language dialog script can be sent to a second computer-readable profile, both in response to the first set of instructions from the first profile.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
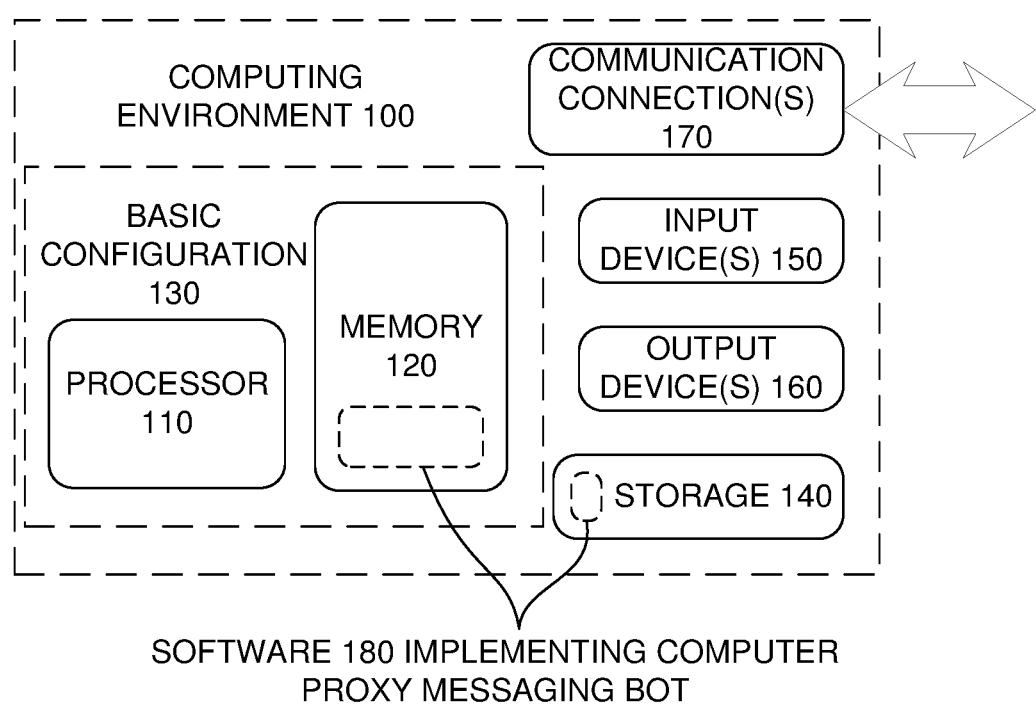
FIG. 1 is a block diagram of a suitable computing environment in which one or more of the described aspects may be implemented.

Aspects described herein are directed to techniques and tools for improvements in the technology of computer messaging bots. Such improvements may result from the use of various techniques and tools separately or in combination.

Such techniques and tools may include having a computer messaging bot (the proxy bot) act as a proxy or go-between for two profiles, with the proxy conducting a first natural language dialog with the first profile and conducting a corresponding second natural language dialog with the second profile, with the proxy bot using results of an analysis of instructions from the first profile to generate and send out different dialog scripts to each of the two profiles. The profiles may be interacting with the proxy bot via different messaging services. For example, one profile may be interacting via a general text messaging service such as simple messaging service (SMS), and another may be interacting with a different messaging service such as a video chat and/or voice call service. Each profile can interact naturally and be presented with its own dialog with the proxy messaging bot, and may not receive or be presented with some or all of the instructions and/or dialog scripts from the dialog with the other user profile. Also, one or both of the profiles may be given an option to switch over from the proxy mode discussed above to a pass-through mode, wherein messages between the two profiles are passed through to the other profile without altering natural language content of the messages (though the format of the messages may be altered, as discussed more below).

These proxy messaging bot tools and techniques can address technical limitations that have previously been present in messaging bots. Such messaging bots typically only interact in a single natural language dialog related to a particular matter at a time. For example, a profile may interact with a messaging bot to place an order for an item. When the order is complete, the order can be forwarded electronically to another profile to have the order fulfilled. If the order-fulfilling profile finds that the order cannot be fulfilled, then the order-fulfilling profile may engage in another communication to reach a user associated with the ordering profile-possibly by sending an email message or placing a telephone call. Such additional interactions can waste computing resources as additional communications and the establishment of additional lines of communication are needed to resolve issues. Such additional interactions can also decrease the usability of the computer system. Of course, the messaging bot may be eliminated altogether, requiring the placing of a direct call or other traditional ordering technique. However, those techniques will not provide the same efficiencies and user-friendliness as the use of a messaging bot that provides for interaction with automated components of a computer system using natural language in a natural and familiar dialog language.

The proxy bot tools and techniques discussed herein can provide solutions to these issues by allowing a proxy messaging bot to conduct a dialog with a first user profile and conduct another related dialog with a second user profile, with instructions provided by the first user profile being used to generated and send out dialog scripts to both user profiles, thereby providing correlation between the two different dialogs. This allows for the efficiencies of computer messaging bots, but can decrease one or more of the inefficiencies noted above, providing for an efficient way to utilize messaging bots in natural language dialogs that can benefit from input from multiple profiles, and possibly even multiple profiles interacting in different dialogs through different messaging services.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment 100 in which one or more of the described aspects may be implemented. For example, one or more such computing environments can be used as a client and/or computer service or framework device in a proxy bot system. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment 100 is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment 100 includes at least one processing unit or processor 110 and memory 120. In FIG. 1, this most basic configuration 130 is included within a dashed line. The processor 110 executes computer-executable instructions and may be a real or a virtual processor. In a multi-processing system, multiple processors execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing a computer proxy messaging bot. An implementation of a computer proxy messaging bot may involve all or part of the activities of the processor 110 and memory 120 being embodied in hardware logic as an alternative to or in addition to the software 180.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment 100 may have additional features. In FIG. 1, the computing environment 100 includes storage 140, one or more input devices 150, one or more output devices 160, and one or more communication connections 170. An interconnection mechanism (not shown)

such as a bus, controller, or network interconnects the components of the computing environment 100. Typically, operating system software (not shown) provides an operating environment for other software executing in the computing environment 100, and coordinates activities of the components of the computing environment 100.

The memory 120 can include storage 140 (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment 100. The storage 140 stores instructions for the software 180.

The input device(s) 150 may be one or more of various different input devices. For example, the input device(s) 150 may include a user device such as a mouse, keyboard, trackball, etc. The input device(s) 150 may implement one or more natural user interface techniques, such as speech recognition, touch and stylus recognition, recognition of gestures in contact with the input device(s) 150 and adjacent to the input device(s) 150, recognition of air gestures, head and eye tracking, voice and speech recognition, sensing user brain activity (e.g., using EEG and related methods), and machine intelligence (e.g., using machine intelligence to understand user intentions and goals). As other examples, the input device(s) 150 may include a scanning device; a network adapter; a CD/DVD reader; or another device that provides input to the computing environment 100. The output device(s) 160 may be a display, printer, speaker, CD/DVD-writer, network adapter, or another device that provides output from the computing environment 100. The input device(s) 150 and output device(s) 160 may be incorporated in a single system or device, such as a touch screen or a virtual reality system.

The communication connection(s) 170 enable communication over a communication medium to another computing entity. Additionally, functionality of the components of the computing environment 100 may be implemented in a single computing machine or in multiple computing machines that are able to communicate over communication connections. Thus, the computing environment 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment 100, computer-readable storage media include memory 120, storage 140, and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Messaging Bot System

Figure 2:
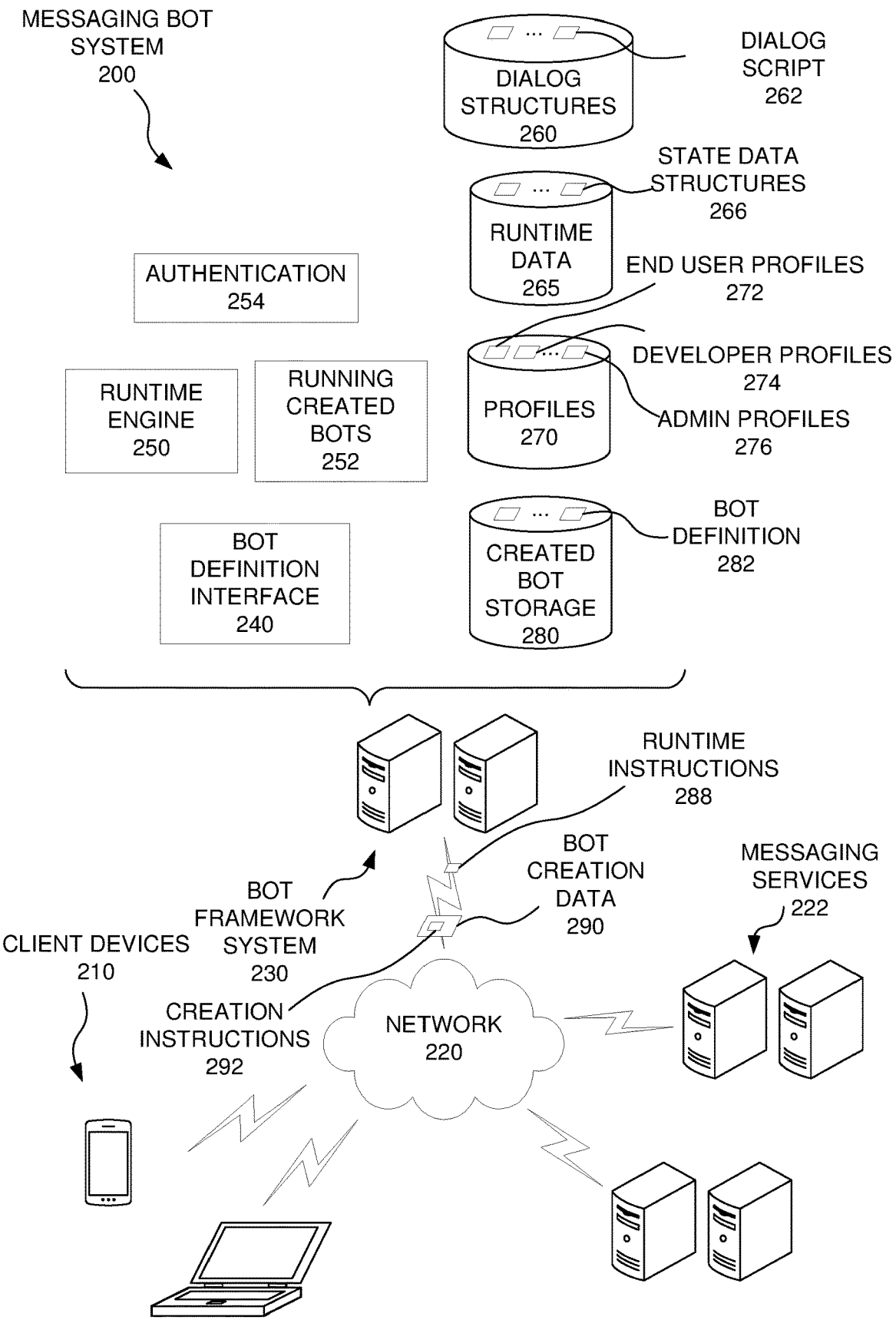
FIG. 2 is schematic diagram of a messaging bot computer system.

FIG. 2 is a block diagram of a messaging bot computer system 200 in conjunction with which one or more of the described aspects may be implemented.

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Referring now to FIG. 2, components of the messaging bot system 200 will be discussed. Each of the components of FIG. 2 and other figures discussed herein includes hardware, and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

A. Overview of Messaging Bot System Components

An overview of the messaging bot system components will now be provided, followed by more detailed discussions of some of the components. The messaging bot computer system 200 can include client devices 210, which can include any of a variety of different types of computing devices, such as desktop computers, laptops, smartphones, wearable devices, etc. The client devices 210 can each be connected to a computer network 220, which may include multiple private and/or public networks within the computer network 220, such as mobile device service networks, the Internet, dedicated computer communication lines, private local area networks, etc. The client devices 210 can interact with computer messaging services 222 over the network 220. For example, such services may provide audio and/or text-based messaging services. Such messaging services may be included within other services, such as messaging services within social network computer services, etc. The messaging services 222 can include multiple different types of messaging services 222.

The messaging services 222 and/or the client devices 210 can also communicate over the computer network 220 with a messaging bot framework computer system 230. The bot framework system 230 can include features for creating messaging bots and features for running messaging bots. Such features may be closely integrated, or they may be separated into different systems, such as a messaging bot development computer system and a messaging bot runtime computer system. The bot framework system 230 can include multiple components. For example, the bot framework system 230 can include a bot definition interface 240 that provides an interface to facilitate defining a messaging bot to be created and/or modified via the client devices 210. For example, the bot definition interface may include a bot development application that can prompt for and receive bot creation instructions, such as programming language code or instructions representing graphical manipulations by a developer profile. Each client device 210 can run one or more applications that is configured to interact with the bot definition interface 240, such as a Web browser and/or other application.

The bot definition interface 240 can receive bot creation data 290 from the client devices 210. For example, the bot creation data 290 can include instructions 292 to create a particular messaging bot definition 282. The instructions 292 may be in the form of user input provided in the form of selections of options on displayed pages on a client device 210, text input on the displayed pages, coded audio and/or video from user input at the client devices 210 while interacting with visual applications on the client devices 210, and so forth. For example, the instructions 292 may be in the form of computer programming language instructions, or in some other form.

The bot framework system 230 can also include a runtime engine 250, which can participate in running created bots 252, which may have been created using the bot framework system. Additionally, the bot framework system 230 can include an authentication component 254, which can authenticate profiles, such as by verifying that proper credentials (usernames, passwords, certificates, keys, etc.) are provided from the client device 210 for the authenticated profile, and possibly from a messaging service 222 through which the client device 210 is interacting with the bot framework system 230.

The bot framework system 230 can include storage of computer-readable data that can be accessed, used, and/or modified by the running components of the bot framework system 230, such as the bot definition interface 240, the runtime engine 250, and/or the running created bots 252. For example, the storage may include dialog structures 260, which can include dialog scripts 262 for the running bots. The dialog scripts 262 can include data representing natural language to be used in natural language messaging dialog scripts sent from the bot framework system 230 to the client devices 210. The dialog structure 260 may also include additional data, such as audio clips for voiced messaging bots, rules that map particular received commands to particular scripts or other particular responses to particular received instructions, rules to govern the learning and use of learned dialog scripts for artificially intelligent messaging bots, etc. Also, the dialog structure 260 may include dialog scripts 262 for different languages, different dialects, different accents, different personalities, different ages, etc.

The storage in the bot framework system 230 can also include runtime data 265, which can include state data structures 266, which can include status data for use at runtime when running messaging bots in the bot framework system 230. For example, the runtime data 265 may include data representing orders made during a bot messaging session, information data representing payments made during a bot messaging session, and/or other data used by the bot framework system 230 when running the created bots 252 and/or the bot definition interface 240.

The storage can also include profiles 270, which may include profiles having permissions to perform in one or more roles. For example, the profiles 270 can include end user profiles 272 (which may represent a single user or a group of users, or other entity) that can interact with the running created bots 252, developer profiles 274 that can provide instructions to create new messaging bots through the bot definition interface 240, and/or administrator profiles 276 that can interact with the bot framework system 230 to manage messaging bots that are already created. The bot framework system 230 can support multiple different roles for computer-readable profiles 270 (such as user profiles).

As used herein, actions may be discussed as being performed by such profiles 270 or to such profiles 270. This means that the actions are performed by or to a computer system where the profile 270 is active, such as a computer system environment where the profile is logged in using proper credentials. As examples of the profiles, a developer profile can define the messaging bot to be created, such as by providing instructions to create the messaging bot. Such instructions may include data indicating characteristics of the messaging bot, such as the bot's name, supported actions, content to be provided by the bot (e.g., digital images, digital videos, digital audio clips, etc.), or other personalized characteristics of the bot (a language, dialect, or accent for the bot; a general personality for the bot; etc.). As another example of a profile having a role, an administrator profile can manage the bot after it is created, such as managing the bot at runtime, examining usage statistics, and/or handling incoming orders supplied by the bot. As another example, an end user profile can interact with the bot in order to access data and/or obtain a service by interacting with the messaging bot using natural language.

The profiles 270 and/or other data in the messaging bot system 200 can include sensitive information such as certain personal information of users represented by the profiles 270. The messaging bot system 200 can include tools and techniques to protect such information. For example, the messaging bot system 200 may send some such information in encrypted form and/or use non-public communication channels. Additionally, at least some such data may be stored in encrypted form, and access to such data may be limited. For example, access may be limited only to profiles 270 with sufficient privileges that need access to the information, or whose information it is. Also, the messaging bot system 200 may employ opt-in and/or opt-out techniques to obtain permission from appropriate parties before storing or otherwise using or obtaining their information. Additional protections for privacy and/or security may also be utilized in the messaging bot system 200.

The storage can also include created bot storage 280, which can include bot definitions 282, which define characteristics of particular bots that have been created. For example, such characteristics may include the type of bot, general topics upon which the bot can converse, and particular information to be inserted in dialog scripts 262 for the particular bot at runtime. The bot definitions 282 may take any of various forms. For example, each bot definition may be a data structure that includes raw metadata representing characteristics of the created bot, with that metadata being accessible by the runtime engine 250 when running the bot at runtime. For example, the metadata could be included in JavaScript Object Notation (JSON) files, extensible markup language (XML) files, database tables, or other data structures. As another example, a bot definition 282 may include computer code to implement selected characteristics of the particular bot. For example, when generating the bot definition 282, the bot framework system 230 may produce such computer code, such as source code, object code, and/or scripting language code.

B. Runtime Engine Details

Additional details of the runtime engine 250 will now be discussed. As discussed above, the runtime engine 250 can run created bots 252, which can include receiving runtime instructions 288 from the client devices 210, and responding by processing those instructions according to the bot definition 282 (such as by identifying an appropriate responsive dialog script 262 and/or entering metadata into the runtime data 265). The runtime engine 250 may also respond by sending one or more responsive dialog scripts 262 back to the client device 210. The runtime instructions 288 and/or the responsive dialog scripts 262 may be sent between the bot framework system 230 and the client device 210 via a messaging service 222. For example, the client device 210 may communicate with one or more front end servers for the messaging service 222, and the bot framework system may communicate with one or more backend servers for the messaging service 222, with the end user profile 272 and the bot framework system 230 both being registered and authenticated with the messaging service 222.

Figure 3:
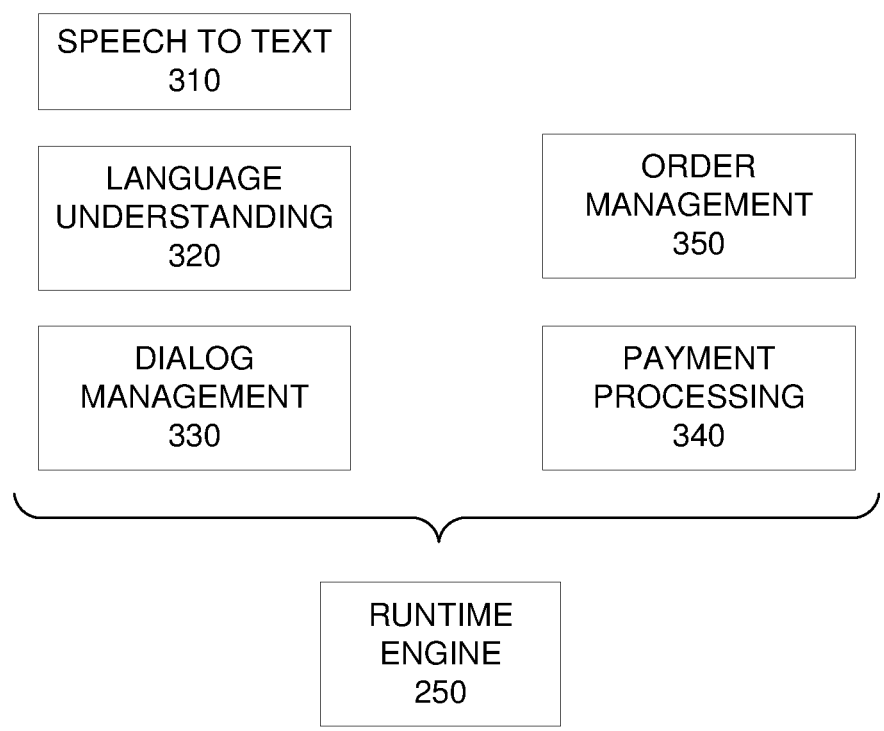
FIG. 3 is a block diagram of components of a runtime engine from the messaging bot computer system of FIG. 2.

Referring to FIGS. 2-3, the runtime engine 250 may include multiple components, which may each be integrated one or more other components or provided separately. Such components can be used for multiple different created bots having different characteristics. In some implementations, the runtime engine may include additional components and/or may omit one or more of the components discussed below. In this example, the runtime engine 250 includes a speech-to-text component 310, which can convert received coded audio speech in runtime instructions 288 and creation instructions 292 from coded audio speech data to data representing text.

The speech-to-text component 310 may use one or more existing speech-to-text processes, and may even invoke an existing speech-to-text engine by passing the speech to the existing speech-to-text engine and receiving results from the engine. For example, the speech-to-text component may utilize an existing overall process such as a Hidden-Markov Model-based process, a dynamic time warping process, or a neural network process. The speech-to-text component 310 may also use one or more performance improving techniques, such as context dependency; cepstral normalization; vocal tract length normalization; maximum likelihood linear regression; delta and delta-delta coefficients; heteroscedastic linear discriminant analysis (LDA); splicing and an LDA-based projection followed by heteroscedastic linear discriminant analysis or a global semi-tied co-variance transform; discriminative training techniques; and/or other speech-to-text performance enhancing techniques.

Data representing text of natural language instructions (whether received as text or produced by the speech-to-text component 310) can be provided to a language understanding component 320. The language understanding component 320 can analyze the natural language text, such as by disassembling and parsing the text and mapping the text to one or more commands that can be executed in response to the natural language instructions, such as by passing the command(s) to one or more of the following components: a dialog management component 330, an order management component 350, and a payment processing component 340. A pre-existing language understanding component 320 may be invoked by passing the natural language text to the pre-existing component with a request to return results representing the meaning(s) of the natural language text. The language understanding component 320 may include one or more known components for natural language understanding. For example, the language understanding component may utilize a lexicon of the natural language, as well as a parser and grammar rules to break each natural language phrase into a data representation of the phrase. The language understanding component 320 may also utilize a semantic theory to guide comprehension, such as a theory based on naïve semantics, stochastic semantic analysis, and/or pragmatics to derive meaning from context. Also, the language understanding component 320 may incorporate logical inference techniques by mapping a derived meaning into a set of assertions in predicate logic, and then using logical deduction to arrive at conclusions as to the meaning of the text. Using results of such language understanding techniques, the language understanding component 320 can map the resulting derived meanings to one or more commands to be passed to one or more other components, as discussed above.

The dialog management component 330 can manage the dialog structures 260, such as by making updates to the dialog scripts 262. Thus, dialog scripts 262 may change for a created bot, without changing the bot definition 282. For example, changes to a dialog script 262 can result in changed dialog scripts for multiple different existing created bots, without changing the bot definitions 282 for those created bots, because the runtime engine 250 can invoke the bot definition 282 to define which sets of dialog scripts 262 to use for that bot, but can rely on the system's dialog scripts 262 for providing the scripts themselves. Each such script 262 may be utilized by multiple different created bots. The dialog management component 330 can also receive commands from the language understanding component 320, and can provide dialog scripts 262 that are appropriate responses to the received commands derived from natural language runtime instructions 288 or creation instructions 292 by the language understanding component 320. Those dialog scripts 262 can be sent back to the interacting profile 270, from which the instructions were received, at an appropriate client device 210 for the profile 270.

The order management component 350 can manage orders received from profiles 270. For example, the order management component 350 can receive commands from the language understanding component 320, and can populate digital orders. The order management component 350 may also forward such orders to an administrative profile 276. For example, if the runtime instructions 288 include an order for a pizza, as determined by the language understanding component 320, the order processing component can populate a digital order template to produce a digital order, and can forward the digital order to an appropriate administrator profile 276 at a client device 210 for fulfilling the order.

The payment processing component 340 can process payments. For example, the runtime instructions 288 may include payment information, such as credit card information and a request to make the payment with the credit card. In response to such a request, the payment processing component 340 can process the payment, such as by communicating with server computers for a credit card company or other payment processing entity over the network 220.

The runtime engine 250 may include other components in addition to or instead of the components of FIG. 3. For example, the runtime engine could include a mapping component for providing directions or other mapping features. Also, if the running created bots 252 will not include ordering or payment processing features, then such components may be omitted from the runtime engine 250.

C. Computer Proxy Messaging Bot System

Figure 4:
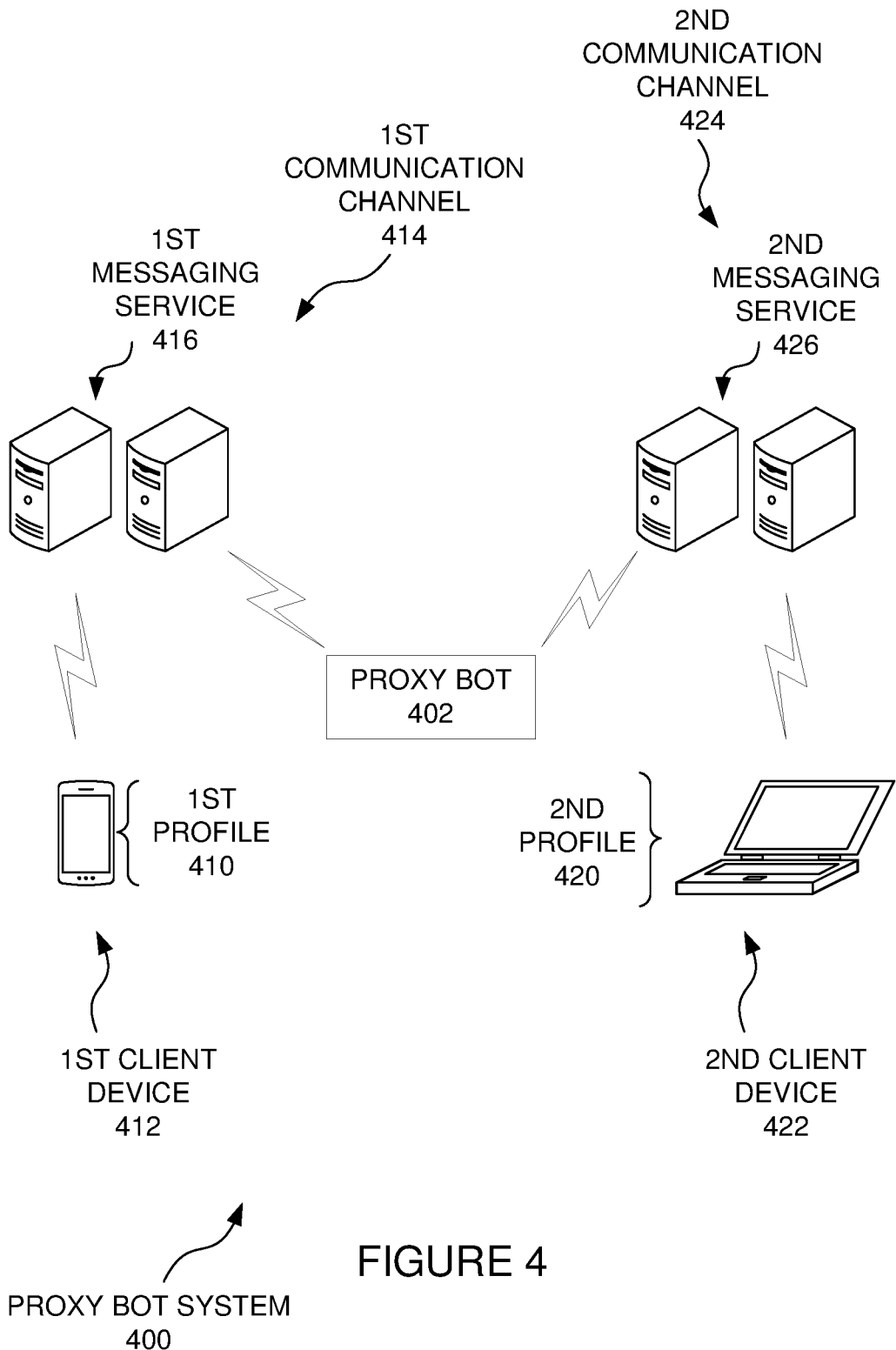
FIG. 4 is a schematic diagram of a proxy bot computer system.

Referring now to FIG. 4, an example of a computer messaging proxy bot system 400 will be discussed in more detail. The proxy bot system 400 can include a proxy bot 402, which can be created and operate as a running created bot 252, utilizing the components of the bot framework system 230 in the messaging bot system 200 discussed above with reference to FIG. 2. Indeed, the components of the bot framework system 230 that support the running of the proxy bot 402, such as by being invoked by the proxy bot 402, can be considered part of the proxy bot 402 itself while the proxy bot 402 is running. A first profile 410 can conduct a first dialog with the proxy bot 402. For example, user input can be provided at a first client computing device 412 to log in the first profile 410 to a system for the proxy bot 402. The first profile can communicate with the proxy bot 402 over a first communication channel 414, which can include a first messaging service 416. While the first profile 410 is illustrated on the first client device 412, the authoritative version of the profile may exist in a remote server, but the first profile can be considered to be active on the first client device 412 when the first profile 410 is logged in through the first client device 412 (such as where user input provides credentials for the first profile 410 to a messaging client on the first client device 412 to authorize communication with a first messaging service 416).

Similarly, a second profile 420 can conduct a second dialog with the proxy bot 402, where the second dialog corresponds to the first dialog in that the proxy bot 402 uses data from the first dialog in conducting the second dialog, and/or uses data from the second dialog in conducting the first dialog. For example, user input can be provided to log in the second profile 420 through a second client computing device 422, as discussed above with respect to the first profile 410 being active on the first client device 412. The second profile 420 can communicate with the proxy bot 402 over a second communication channel 424, which can include a second messaging service 426, which can be different from the first messaging service 416. The second client device 422 can be configured for the second profile 420 to communicate with the proxy bot 402 via the second messaging service 426.

As an example, the first messaging service 416 may be an SMS text messaging service, and the second messaging service 426 may be a voice and/or video conferencing service, which may include text messaging capabilities in addition to audio conferencing capabilities. The first profile 410 can communicate with a front end service of the first messaging service 416, and the proxy bot 402 can communicate with a backend service of the first messaging service 416 (such as using application programming interface calls using interfaces exposed by the first messaging service 416 and the framework for the proxy bot 402). Similarly, the second profile 420 can communicate with a front end service of the second messaging service 426, and the proxy bot 402 can communicate with a backend service of the second messaging service 426. Thus, the first profile 410 can communicate with the proxy bot 402 using a standard messaging client of the first messaging service 416 (which may be hardware on the first client device 412 configured according to a software application that is configured to communicate with the first messaging service 416). Similarly, the second profile 420 can communicate with the proxy bot 402 using a standard messaging client of the first messaging service 416 (which may be, for example, hardware on the first client device 412 configured according to a software application that is configured to communicate with the first messaging service 416).

The proxy bot 402 can utilize data from communications in each of the dialogs in generating and sending dialog scripts in the other dialog. For example, the proxy bot 402 can use data from its analysis of instructions received from the first profile 410 as part of a first dialog in generating dialog scripts that it can send to the second client profile 420 as part of a second dialog between the proxy bot 402 and the second profile 420. Similarly, the proxy bot 402 can use data from its analysis of instructions received from the second profile 420 as part of a second dialog in generating dialog scripts that it can send to the first client profile 410 as part of a second dialog between the proxy bot 402 and the second profile 420.

The communications between components in the proxy bot system may be made with standard computer communication hardware, such as computer network hardware components. The architecture of the proxy bot system 400 may be configured differently from what is illustrated in FIG. 4. For example, one or both of the profiles may communicate with the proxy bot 402 without going through a separate messaging service. As another example, both profiles may communicate with the proxy bot 402 through the same messaging service. Also, the proxy bot 402 may be a unified and integrated bot, or it may be split into multiple components that communicate with each other. For example, the proxy bot 402 may include a first bot component that conducts a dialog with the first profile 410 and a second bot component that conducts a corresponding dialog with the second profile 420, with the proxy bot 402 correlating operations of the different components.

D. Computer Proxy Messaging Bot Dialog Example

Figure 5:
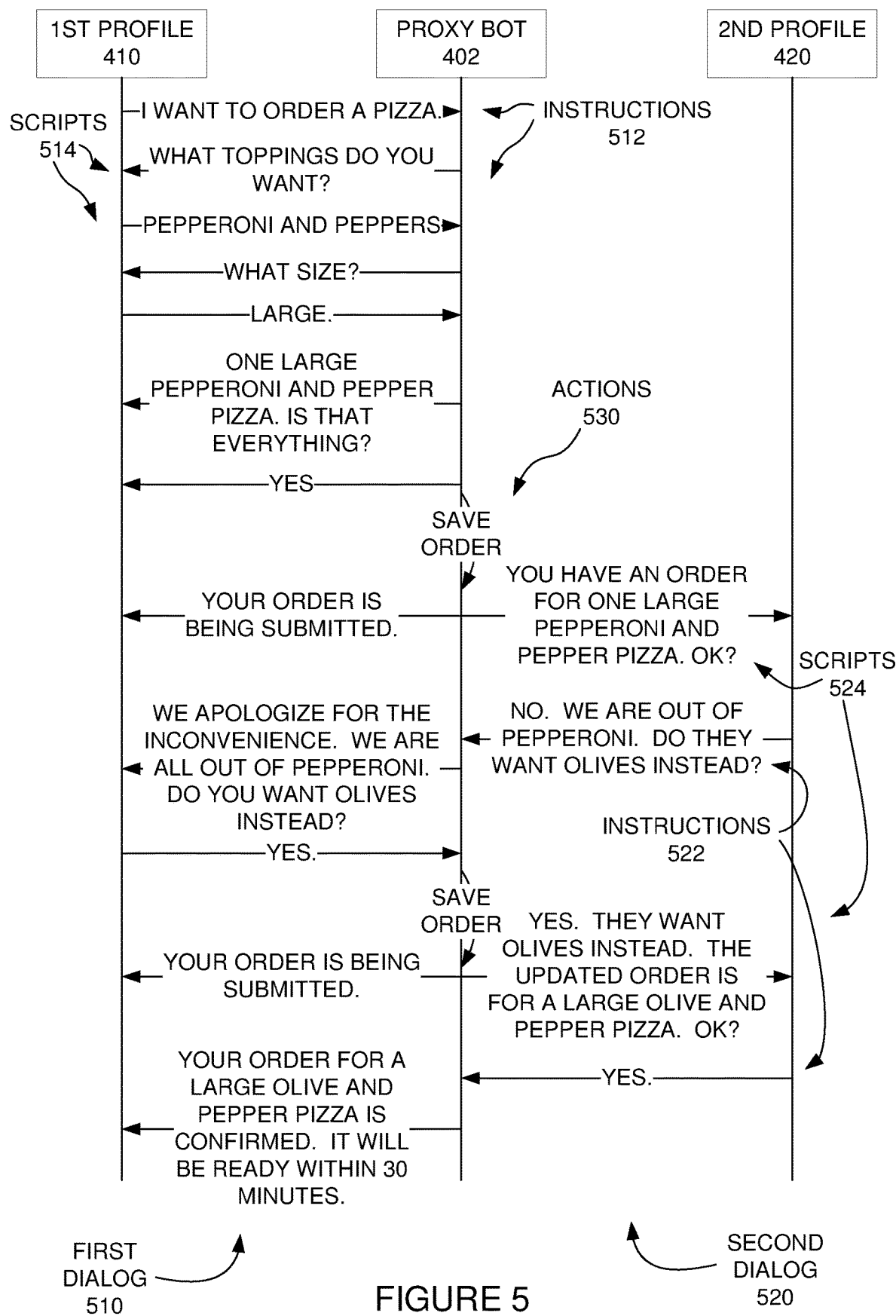
FIG. 5 is a schematic diagram illustrating a first dialog between a first profile and a proxy bot, and a second dialog between a second profile and the proxy bot.

Referring now to FIG. 5, a pair of dialogs between the first profile 410 and the proxy bot 402, and between the second profile 420 and the proxy bot 402 are illustrated. In the illustration of FIG. 5, messages between the components (the proxy bot 402, the first profile 410, and the second profile 420) are illustrated with arrows extending horizontally between vertical lines extending down from boxes, with the vertical lines representing the three components. The text in each arrow extending between the vertical lines illustrates the natural language of a message (a dialog script from the proxy bot 402 or an instruction to the proxy bot 402) represented by that arrow. Each message may be in any of various forms, such as coded audio voice data, coded video data, textual messaging data, etc.

A first dialog 510 between the first profile 410 and the proxy bot 402 can include digital natural language instructions 512 from the first profile 410 to the proxy bot 402 and responsive digital natural language dialog scripts 514 from the proxy bot 402 to the first profile 410. A second dialog 520 between the second profile 420 and the proxy bot 402 can include digital natural language instructions 522 from the second profile 420 to the proxy bot 402 and responsive digital natural language dialog scripts 524 from the proxy bot 402 to the second profile 420. Besides generating and sending the responsive dialog scripts 524, the proxy bot can also respond with other actions 530, such as saving and submitting orders or other requests, submitting information for payment processing, and/or other actions 530. A client device where the first profile 410 is active may present only the instructions 512 and/or scripts 514 in the first dialog 510 without presenting instructions 512 and/or scripts 514 from the second dialog 520. Similarly, a client device where the second profile 420 is active my present only the instructions 522 and/or scripts 524 from the second dialog 520 without displaying instructions 522 and/or scripts 524 from the first dialog 510. In this example, the first profile 410 can be a profile controlled by a user that wants to order a pizza, and the second profile 420 can be a profile controlled by a user that is working at a pizza restaurant that will receive the order and provide the pizza. However, the tools and techniques discussed herein could apply to many other scenarios that include a first dialog between a first profile and a proxy bot, as well as a corresponding second dialog between a second profile and that proxy bot.

In the first dialog 510, the first profile 410 can send an instruction 512 to the proxy bot 402, stating "I want to order a pizza." The proxy bot 402 can analyze this received instruction (such as via components of a runtime engine such as runtime engine 250, discussed above), resulting in the proxy bot 402 determining that a pizza is to be ordered by the first profile 410. Accordingly, the proxy bot 402 can respond by beginning a dialog that allows a pizza to be ordered via the proxy bot 402. For example, as illustrated in FIG. 5, the proxy bot 402 can generate and send to the first profile 410 a dialog script 514 that prompts for data from the first profile 410, stating "What toppings to you want?" This dialog script 514 can be received by the first profile 410, such as by being received and processed in an environment where the first profile 410 is active at a client device 210 (see FIG. 2). Such a client device 210 can process the dialog script 514 and present the dialog script 514, such as by displaying the dialog script on a computer display and/or audibly reading the dialog script 514 with speakers. The other dialog scripts 514 may be presented in a similar manner, and the instructions may also be presented on a client device, such as by presenting the instructions and responsive dialog texts in a visual display of a chat session. The instructions 522 and dialog scripts 524 may also be presented in a similar manner, with a client device for the second profile 420 presenting the dialog scripts 524 and possibly also the instructions 522 of the second dialog 520.

In response to this "What toppings to you want?" dialog script 514, user input may be provided at the client device 210, which can result in the client device 210 processing the user input so that the first profile 410 sends another instruction 512 to the proxy bot 402, reading, "Pepperoni and Peppers." The dialog can continue with the proxy bot 402 responding with a dialog script 514 reading, "What size?", and the first profile 410 responding by generating and sending an additional instruction reading, "Large." The proxy bot 402 can determine that sufficient data has been received for the pizza order, and can respond by generating and sending the following dialog script 514 to the first profile 410: "One large pepperoni and pepper pizza. Is that everything?" The first profile 410 can respond with an instruction 512 that reads, "Yes."

In response to the set of instructions 512, including this instruction 512 confirming that the order is complete, the proxy bot 402 can perform an action 530 saving a digital computer-readable order (such as in the runtime data 265 discussed above with reference to FIG. 2), as well as sending an additional dialog script 514 to the first profile 410 stating, "Your order is being submitted."

The proxy bot 402 can also respond to the set of instructions 512 from the first profile 410 in the first dialog 510 by generating and sending a dialog script 524 to the second profile 420 in the second dialog 520. That dialog script 524 can read, "You have an order for one large pepperoni and pepper pizza. OK?" The second dialog 520 can continue with the second profile 420 responding by receiving user input and sending an instruction 522, reading, "No. We are out of pepperoni. Do they want olives instead?" The proxy bot 402 can respond to this instruction 522 from the second profile 420 in the second dialog 520 by generating and sending a dialog script 514 to the first profile 410 as part of the first dialog 510, stating, "We apologize for the inconvenience. We are all out of pepperoni. Do you want olives instead?" The first profile 410 can respond with an instruction reading, "Yes."

In response to the set of instructions 512 in the first dialog 510, the proxy bot 402 can take an action by saving the updated order. Additionally, the proxy bot 402 can respond to this confirming instruction 512 by generating and sending different dialog scripts to the two different profiles. These dialog scripts can include a dialog script 514 to the first profile 410 stating, "Your order is being submitted." The dialog scripts can also include a dialog script 524 to the second profile 420 stating, "Yes. They want olives instead. The updated order is for a large olive and pepper pizza. OK?" The second profile 420 can respond to this dialog script 524 by sending an instruction 522, stating, "Yes."

In response to this confirming instruction 522 from the second profile 420, the proxy bot 402 can generate and send a dialog script 514 to the first profile 410 stating, "Your order for a large olive and pepper pizza is confirmed. It will be ready within 30 minutes." The proxy bot 402 could also respond with a confirming dialog text to the second profile 420, such as by generating and sending a dialog script stating, "The order is complete. Please prepare the pizza for the customer."

The proxy bot 402 may save and maintain data reflecting both dialogs in volatile and/or non-volatile memory, such as in state data structures 266 in the runtime data 265 discussed above with reference to FIG. 2. For example, the runtime data 265 may include a unified structure that includes data representing both dialogs, or a state data structure 266 may include a first portion representing a first dialog and a second portion representing a related second dialog, where the portions may be co-located, or they may be distributed and located remotely from each other. Either way, the runtime data 265 can include a current record of the state of each dialog, allowing the proxy bot 402 to use data from one or more previous instructions from one dialog in generating and sending dialog scripts in the other dialog. For example, the proxy bot 402 may use data from the runtime data 265, including data resulting from analysis from received instructions from the profiles, in selecting a dialog script template from the dialog structures 260. The proxy bot 402 may also include data from the runtime data 265 in dialog script templates from the dialog structures 260 of FIG. 2 when generating the dialog scripts to be sent to the profiles from the proxy bot 402.

The example discussed above of running the bot may be altered in different examples. For example, a bot dialog display that displays a dialog with a running created bot could include displayed controls (such as displayed buttons) to be selected instead of or in addition to the options to either enter a number or provide natural language text for an option. Thus, for example, for a pizza size, a large size above could be selected by user input stating "large", or by user input stating "2" as a number corresponding to the large size, or by user input selecting a button that reads "LARGE". Of course, other variations in user input could also be provided.

Also, additional enhancements may be provided for the bots at runtime. As an example, the runtime data 265 discussed above with respect to FIG. 2 may store data for a user between different sessions. Such historical runtime data may be used to expedite future interactions with the same profile, such as by remembering the last order or frequent orders. For, example, after receiving runtime instructions stating, "I would like to order a pizza," the bot may respond with the following: "Which Pizza would you like? (1) Large mushroom pizza like last time, or (2) Another pizza?"

III. Computer Proxy Messaging Bot Techniques

Several computer proxy messaging bot techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 6:
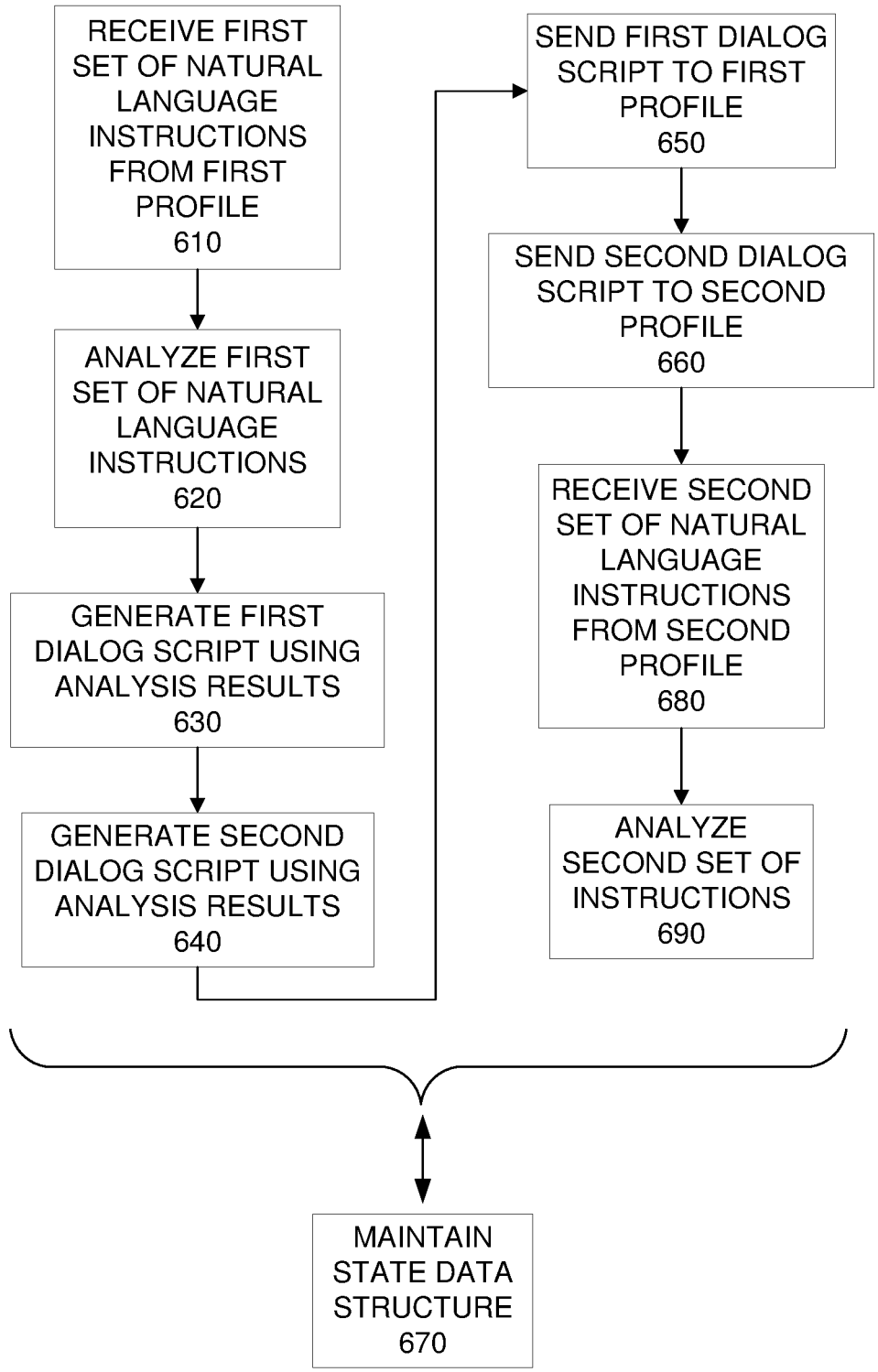
FIG. 6 is a flowchart of a computer proxy messaging bot technique.

Referring to FIG. 6, a computer proxy messaging bot technique will be described. The technique can include receiving 610 via a computer proxy messaging bot, a first set of natural language instructions from a first computer-readable profile. The technique can also include analyzing 620 the first set of natural language instructions (such as by performing speech-to-text analysis, language understanding analysis, matching of meanings derived for the language understanding analysis to commands for dialog scripts to be sent or commands for other actions, and/or other analysis). Also, the technique can include generating 630 a first natural language dialog script using results of the analyzing of the first set of natural language instructions. Additionally, the technique can include generating 640 a second natural language dialog script using the results of the analyzing of the first set of natural language instructions, with the second natural language dialog script including natural language data derived from the first set of natural language instructions (such as language with similar meanings to language in the first set of natural language instructions, or language in a dialog script that is identified as responsive to the natural language instructions, etc.), and with the second natural language dialog script being different from the first set of natural language instructions and different from the first natural language dialog script. The generating 630 of the first dialog script and/or the generating 640 of the second dialog script may be performed in response to the receiving 610 of the first set of natural language instructions from the first profile. The technique of FIG. 6 can also include, in response to the receiving 610 of the first set of natural language instructions, sending 650 the first natural language dialog script to the first profile via the proxy messaging bot, and sending 660 the second natural language dialog script to a second computer-readable profile via the proxy messaging bot. The first and second computer-readable profiles can be different from each other. One or more of the features in the following paragraphs can be utilized in combination with the features of this paragraph, in various different combinations.

The technique of FIG. 6 can further include maintaining 670 a state data structure that represents a state of a first natural language dialog between the first profile and the proxy bot and also represents a second dialog between the second profile and the proxy bot. The first natural language dialog can include the first set of natural language instructions and the first natural language dialog script, and the second natural language dialog can include the second natural language dialog script, and may also include instructions from the second profile to the proxy bot.

Also, the technique of FIG. 6 can include receiving 680, via the proxy messaging bot, a second set of natural language instructions from the second profile, with the second set of natural language instructions being responsive to the second natural language dialog script. The technique may further include analyzing 690 the second set of natural language instructions.

The technique may further include generating a third natural language dialog script using results of the analyzing of the second set of natural language instructions. Also, the technique may include generating a fourth natural language dialog script using the results of the analyzing of the second set of natural language instructions, with the fourth natural language dialog script including natural language data derived from the second set of natural language instructions, and with the fourth natural language dialog script being different from the second set of natural language instructions and different from the third natural language dialog script. Moreover, the technique may include, in response to the receiving of the second set of natural language instructions from the second profile, sending the third natural language dialog script to the second profile via the proxy messaging bot and sending the fourth natural language dialog script to the first computer-readable profile via the proxy messaging bot.

The receiving of the first set of natural language instructions, the analyzing of the first set of natural language instructions, the generating of the first natural language dialog script, the generating of the second natural language dialog script, the sending of the first natural language dialog script, and the sending of the second natural language dialog script can all be performed as part of a proxy mode of operating a computer system. The technique of FIG. 6 may further include receiving a request from the first profile or the second profile to conduct direct messaging between the first profile and the second profile (such as voice communications, video communications and/or direct textual messaging). In response to the request, handling of instructions from the first profile and the second profile can be changed from proxy mode to pass-through mode. The proxy mode and the pass-through mode can both include communicating with the first profile over the same channels for both modes. For example, both modes may be performed utilizing the same messaging services between for passing communications to the respective profiles. The proxy mode and pass-through mode can both include communicating with the second profile over the same channel for both modes, with the pass-through mode including passing natural language messages from the first profile to the second profile without altering natural language content of the messages from the first profile, and with the pass-through mode including passing natural language messages from the second profile to the first profile without altering natural language content of the messages from the second profile.

The technique of FIG. 5 can include, in response to the receiving of the first set of natural language instructions, performing a computer action requested in the first set of natural language instructions. The requested action can be an action other than the sending of a natural language dialog script. The second natural language dialog script can indicate that the computer action has been performed.

Referring still to FIG. 6, the receiving 610 of the first set of natural language instructions can include receiving the first set of natural language instructions from a first computer messaging service with an indication that the first set of natural language instructions are from the first profile. The sending 650 of the first natural language dialog script can include sending the first natural language dialog script to the first computer messaging service addressed to the first profile. The sending 660 of the second natural language dialog script can include sending the second natural language dialog script to a second computer messaging service addressed to the second profile, with the second messaging service being different from the first messaging service.

The first set of natural language instructions and the first natural language dialog script can be part of a first dialog between the first profile and the proxy bot. The second natural language dialog script can be part of a second dialog between the second profile and the proxy bot. The computer proxy messaging bot can act as a proxy between the first profile and the second profile for the first dialog and the second dialog. The computer proxy messaging bot can maintain a state data structure that represents a state of the first dialog and a state of the second dialog, including natural language communications between the computer proxy bot and both the first profile and the second profile. The generating 640 of the second natural language dialog script can include accessing and using state data representing the state of the first dialog from the state data structure, with the state data being derived from one or more natural language instruction messages from the first profile.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system, comprising:
   at least one processor; and
   a memory storing instructions that, when executed by the at least one processor, perform operations, comprising:
   in response to an initialization of a conversation session between a computer proxy messaging bot and a first profile that is associated with a first user, receiving, via the computer proxy messaging bot, a first set of natural language instructions from the first profile, the first set of natural language instructions indicating an intent of the first user for the conversation session, the first profile being a user profile comprising information about the first user;
   generating, via the computer proxy messaging bot, a first natural language dialog script based on the first set of natural language instructions, the first natural language dialog script comprising a query for clarifying the intent of the user;
   sending the first natural language dialog script to the first profile via the proxy messaging bot;
   receiving, via the computer proxy messaging bot, a second set of natural language instructions from the first profile, the second set of natural language instructions comprising a response to the query;
   generating a second natural language dialog script based on the first set of natural language instructions and the second set of natural language instructions, the second natural language dialog script including natural language data derived from at least one of the first set of natural language instructions and the second set of natural language instructions, the second natural language dialog script being different from the first natural language dialog script; and
   sending, via the computer proxy messaging bot, the second natural language dialog script to a second profile that is different from the first profile, the second profile being a user profile comprising information about a second user associated with the second profile.

2. The computer system of claim 1, further comprising instructions for
   receiving a request from the first profile or the second profile to conduct direct messaging between the first profile and the second profile.

3. The computer system of claim 1, further comprising instructions for:
   receiving, via the proxy messaging bot, a third set of natural language instructions from the second profile, the third set of natural language instructions being responsive to the second natural language dialog script; and
   analyzing the third set of natural language instructions.

4. The computer system of claim 3, further comprising instructions for generating a third natural language dialog script using results of the analyzing of the third set of natural language instructions.

5. The computer system of claim 1, further comprising instructions for:
   performing a computer action requested in the first set of natural language instructions.

6. The computer system of claim 5, wherein the second natural language dialog script indicates a requested action to be performed by the second user.

7. The computer system of claim 1, wherein receiving the first set of natural language instructions comprises receiving the first set of natural language instructions from a first computer messaging service with an indication that the first set of natural language instructions are from the first profile.

8. The computer system of claim 1, wherein the first set of natural language instructions and the first natural language dialog script are part of a first dialog between the first profile and the proxy messaging bot, and the second natural language dialog script is part of a second dialog between the second profile and the proxy messaging bot.

9. The computer system of claim 8, wherein generating the second natural language dialog script comprises accessing and using state data representing the state of the first dialog, the state data being derived from a plurality of natural language instruction messages from the first profile.

10. A computer-implemented method, comprising:
   in response to an initialization of a conversation session between a computer proxy messaging bot and a first user, receiving, via the computer proxy messaging bot, a first set of natural language instructions from a first profile, the first set of natural language instructions indicating an intent of the first user for the conversation session, the first profile being a user profile comprising information about the first user associated with the first profile;
   generating, via the computer system running the proxy messaging bot, a first natural language dialog script based on the first set of natural language instructions, the first natural language dialog script comprising a query for clarifying the intent of the user;
   sending, via the computer system running the proxy messaging bot, the first natural language dialog script to the first profile via the proxy messaging bot;
   receiving, via the computer proxy messaging bot, a second set of natural language instructions from the first profile, the second set of natural language instructions comprising a response to the query;
   generating, via the computer system running the proxy messaging bot, a second natural language dialog script based on the first set of natural language instructions and the second set of natural language instructions, the second natural language dialog script including natural language data derived from at least one of the first set of natural language instructions and the second set of natural language instructions, the second natural language dialog script being different from the first natural language dialog script;
   sending, via the computer system running the proxy messaging bot, the second natural language dialog script to a second profile that is different from the first profile, the second profile being a user profile comprising information about a second user associated with the second profile; and
   maintaining a state data structure that represents a state of a first natural language dialog between the first profile and the proxy messaging bot and a second natural language dialog between the second profile and the proxy messaging bot, the first natural language dialog comprising the first set of natural language instructions and the first natural language dialog script, the second natural language dialog comprising the second natural language dialog script.

11. The computer-implemented method of claim 10, further comprising:
   receiving a request from the first profile or the second profile to conduct direct messaging between the first profile and the second profile.

12. The computer-implemented method of claim 10, further comprising:
   receiving, via the proxy messaging bot, a third set of natural language instructions from the second profile, the third set of natural language instructions being responsive to the second natural language dialog script; and
   analyzing the third set of natural language instructions.

13. The computer-implemented method of claim 12, further comprising:
   generating a third natural language dialog script using results of the analyzing the third set of natural language instructions.

14. The computer-implemented method claim 10, further comprising:
   performing a computer action requested in the first set of natural language instructions, the requested action being an action other than a sending of a natural language dialog script.

15. The computer-implemented method of claim 14, wherein the second natural language dialog script indicates a requested action to be performed by the second user.

16. The computer-implemented method claim 10, wherein receiving the first set of natural language instructions comprises receiving the first set of natural language instructions from a first computer messaging service with an indication that the first set of natural language instructions are from the first profile.

17. The computer-implemented method claim 10, wherein generating the second natural language dialog script comprises accessing and using state data representing a state of the first natural language dialog from the state data structure, the state data being derived from a plurality of natural language instruction messages from the first profile.

18. A computer-readable memory having computer-executable instructions stored thereon that, when executed by at least one processor, cause at least one processor to perform operations, comprising:
   in response to an initialization of a conversation session between a computer proxy messaging bot and a first user, receiving, via the computer proxy messaging bot, a first set of natural language instructions from a first profile, the first set of natural language instructions indicating an intent of the first user for the conversation session, the first profile being a user profile comprising information about the first user associated with the first profile;
   generating, via the computer proxy messaging bat, a first natural language dialog script based on the first set of natural language instructions, the first natural language dialog script comprising a query for clarifying the intent of the user;
   sending the first natural language dialog script to the first profile via the proxy messaging bot;
   receiving, via the computer proxy messaging bot, a second set of natural language instructions from the first profile, the second set of natural language instructions comprising a response to the query;
   generating a second natural language dialog script based on the first set of natural language instructions and the second set of natural language instructions, the second natural language dialog script including natural language data derived from at least one of the first set of natural language instructions and the second set of natural language instructions, the second natural language dialog script being different from the first natural language dialog script;
   sending, via the computer proxy messaging bot, the second natural language dialog script to a second profile that is different from the first profile, the second profile being a user profile comprising information about a second user associated with the second profile; and
   receiving, via the proxy messaging bat, a third set of natural language instructions from the second profile, the third set of natural language instructions being responsive to the second natural language dialog script.

19. The one or more computer-readable memory of claim 18, further comprising instructions for generating a third natural language dialog script based on the third set of natural language instructions.

20. The one or more computer-readable memory of claim 18, further comprising instructions for performing a computer action requested in the first set of natural language instructions, the requested action being an action other than the sending of a natural language dialog script, the second natural language dialog script indicating that the computer action has been performed.

* * * * *